United States Patent
Zalewski

(10) Patent No.: US 7,310,120 B2
(45) Date of Patent: Dec. 18, 2007

(54) RECEIVER OF ANALOGUE VIDEO SIGNAL HAVING MEANS FOR ANALOGUE VIDEO SIGNAL CONVERSION AND METHOD FOR CONTROL OF DISPLAY OF VIDEO FRAMES

(75) Inventor: Marcin Zalewski, Zielona Gora (PL)

(73) Assignees: Advanced Digital Broadcast Polska Sp. z o.o., Zielona Góra (PL); Advanced Digital Broadcast Ltd., Taipei (TW)

( * ) Notice: Subject to any disclaimer, the term of this patent is extended or adjusted under 35 U.S.C. 154(b) by 519 days.

(21) Appl. No.: 10/711,581

(22) Filed: Sep. 27, 2004

(65) Prior Publication Data

US 2005/0073611 A1   Apr. 7, 2005

(30) Foreign Application Priority Data

Oct. 6, 2003   (PL) .................................. 362631

(51) Int. Cl.
*H04N 9/64* (2006.01)
*H04N 7/01* (2006.01)

(52) U.S. Cl. .................. 348/715; 348/441; 348/500

(58) Field of Classification Search ........ 348/714–716, 348/718, 719, 500, 511, 441, 459, 443, 572; 345/545–547; 711/5; 375/240, 240.21, 375/240.25
See application file for complete search history.

(56) References Cited

U.S. PATENT DOCUMENTS

| | | | | |
|---|---|---|---|---|
| 5,276,513 A | * | 1/1994 | van der Wal et al. ... | 375/240.16 |
| 5,321,500 A | * | 6/1994 | Capitant et al. ............... | 348/97 |
| 5,446,496 A | | 8/1995 | Foster et al. | |
| 5,557,337 A | * | 9/1996 | Scarpa ........................ | 348/558 |
| 5,680,175 A | * | 10/1997 | Yanai et al. ................. | 348/441 |
| 6,442,206 B1 | * | 8/2002 | Hrusecky ............... | 375/240.21 |
| 6,470,051 B1 | * | 10/2002 | Campisano et al. ... | 375/240.21 |
| 6,519,283 B1 | * | 2/2003 | Cheney et al. ......... | 375/240.01 |
| 6,654,539 B1 | * | 11/2003 | Duruoz et al. ................. | 386/68 |
| 6,658,056 B1 | * | 12/2003 | Duruoz et al. .............. | 375/240 |
| 2002/0154129 A1 | * | 10/2002 | Goyins et al. .............. | 345/540 |
| 2003/0002584 A1 | * | 1/2003 | Campisano et al. ... | 375/240.21 |

\* cited by examiner

*Primary Examiner*—Victor R. Kostak
(74) *Attorney, Agent, or Firm*—Matthias Scholl P.C.; Matthias Scholl

(57) ABSTRACT

A receiver of analogue video signal having means for analogue video signal conversion has a receiving block (201) for receiving a first analogue video signal, a conversion block (202) for conversion of the first analogue signal into a digital signal, a buffer controller (203) of frame buffers, a video coder (204) for transforming the digital signal into an analogue signal of a second format, a receiver (205) for displaying the analogue signal of a second format and a processor (206) for data processing and controlling the receiving block, the conversion block, the buffer controller, the video coder and the receiver. The buffers controller (203) has three modules, namely, buffers (203*b*) linked together, a decoding frame controller (203*a*) and a displaying frame controller (203*c*). Certain frames in this device will be omitted when the output frames frequency is lower than the input frequency and displayed more than once when the output frames frequency is higher than the input frequency.

7 Claims, 7 Drawing Sheets

RECEIVER OF ANALOGUE VIDEO SIGNAL HAVING MEANS FOR ANALOGUE VIDEO SIGNAL CONVERSION AND METHOD FOR CONTROL OF DISPLAY OF VIDEO FRAMES

CROSS-REFERENCE TO RELATED APPLICATIONS

This application claims priority to Polish Application No. P-362631, filed Oct. 6, 2003, the contents of which are incorporated herein by reference.

BACKGROUND OF THE INVENTION

1. Field of the Invention

The present invention relates to a receiver of analogue video signal having means for analogue video signal conversion and a method for control of display of video frames, used in digital decoders/receivers of television signal, in which the signal is received in an analogue form, and then, after conversion into a digital signal, it is processed in the decoder/receiver (e.g. OSD 'On-Screen Display' functions are applied). Next it is converted to an analogue format, which is transmitted to a receiver, for example a TV set.

2. Brief Description of the Background of the Invention Including Prior Art

The methods of controlling display of video signal frames, known from the prior art, can be divided into three groups. The first group uses a single frame buffer, and the input of video signal (refresh frequency timer) is not synchronized with the output. The drawback of this solution are the interferences, which appear during the displaying of video frames. They appear, for instance, as a shift of the top part of the picture in relation to the bottom part.

The second solution consists in applying a single frame buffer and synchronization of the input signal timers with the output signal. Although interferences occurring in the first method do not appear here, it is still necessary to synchronize the timers. Moreover, there appear problems related to switching among input signals with different synchronization frequencies/phases.

The third method, called "back buffering" or "double buffering", requires two frame buffers. Data are fetched into the first one, and next they are copied to the second one. The contents of the second buffer are displayed. A disadvantage of this solution is the necessity of copying large amounts of data.

The U.S. Pat. No. 5,446,496 presents a solution, in which the frequency of video frames is converted. The output frequency in this solution must be lower than the input frequency. Moreover, a single frame buffer is used for the conversion, which—during considerable discrepancies between input and output frame frequencies—may lead to the loss of many video signal frames. This is due to the fact, that the currently displayed data cannot be overwritten.

SUMMARY OF THE INVENTION

Purposes of the Invention

It is the object of this invention to eliminate the interferences and allowing a conversion of video frames frequency, in such a way, that the output frequency can be either lower or higher than the input frequency.

This and other objects and advantages of the present invention will become apparent from the detailed description, which follows.

BRIEF DESCRIPTION OF THE INVENTION

A receiver of analogue video signal having means for analogue video signal conversion, according to the present invention, comprises a receiving block for receiving a first analogue video signal or an input video signal, a conversion block for conversion of the first analogue signal, of a first format, into a digital signal and connected to the receiving block, a buffer controller of frame buffers, connected to the conversion block, the buffer controller comprising three modules, (a) buffers linked together, (b) a decoding frame controller and (c) a displaying frame controller, a video coder for transforming the output digital signal into an output analogue signal or an analogue signal of a second format, a receiver for displaying the analogue signal of a second format and a processor for data processing and controlling the receiving block, the conversion block, the buffer controller, the video coder and the receiver.

In the method, according to the present invention, two processes are initiated. The first one controls fetching and decoding of frames from the source of the signal recorded in a first video format, and storing them in the chosen frame buffers. The second one controls displaying frames, stored in frame buffers, where the displaying preferably takes place in a second video format. These processes communicate between each other, setting the moment, which is related to signals frequencies, and place, being the chosen buffer, for the fetching and displaying of video frames with the application of at least three video frame buffers.

The method presented here applies to processing of video frames, which are read from an analogue video signal source. These frames are processed and then displayed by an analogue signal receiver, such as a television set. Data that are needed for processing and displaying the frames are transmitted in the source signal. They may, for instance, comply with the ITU-R BT.601-5 or ITU-R BT.656-4 specifications. The method for control of display of video frames comprises applying at least three frame buffers, fetching frames from signal data, temporarily storing the frames of a first video format in the first buffer chosen from the buffers and reading and displaying the frames in a second video format. The frame buffers can be organized in a two-way list form, in which the first element of the list has a pointer to the last element and the last element of the list has a pointer to the first element of the list.

The fetching and decoding of the frames favorably starts with setting the current decoder buffer pointer, to which the a frame will be decoded, to the first buffer of the two-way list of buffers, awaiting for a bottom vertical synchronization signal from an input video signal, checking if a next buffer, in relation to the current decoder buffer, is being displayed, when the bottom vertical synchronization signal is detected, setting the next buffer as the current decoder buffer when the next buffer is not displayed, detecting a top vertical synchronization signal in the analogue input signal data, decoding data to the current decoder buffer and awaiting for the next bottom vertical synchronization signal from the input video signal.

The reading and displaying of data favorably starts from setting the first buffer from a list of buffers as the current displayed buffer and then awaiting for an appearance of a bottom vertical synchronization signal in an analogue output video signal. After such signal is detected, setting the previous buffer in relation to the current decoder buffer as the current displayed buffer and, after the appearance of the top vertical synchronization signal, displaying the current display buffer, and returning to the awaiting for the bottom vertical synchronization signal in the output video signal.

According to the method, data is buffered in the list of frame buffers used in the device, which temporarily store the received video frames. Such list consists of at least three buffers, where each of them stores a single video frame. The present invention allows avoiding problems with the synchronization of the input signal frame timer with the output signal frame timer. The received data are processed in such a way, that the reading does not conflict with the writing, and no interferences are introduced to the output analogue signal. Moreover, contrary to the known solutions, picture interference is avoided, as is the need for the transfer of large amount of data between separate frame buffers. Thanks to data buffering in the queue of the frame buffers, and to the method of controlling it, problems with synchronization of the input signal frame timer with the of output signal frame timer, can be also avoided.

BRIEF DESCRIPTION OF THE DRAWINGS

In the accompanying drawings one of the possible embodiments of the present invention is shown, where.

DESCRIPTION OF INVENTION AND PREFERRED EMBODIMENT

Figure 1:
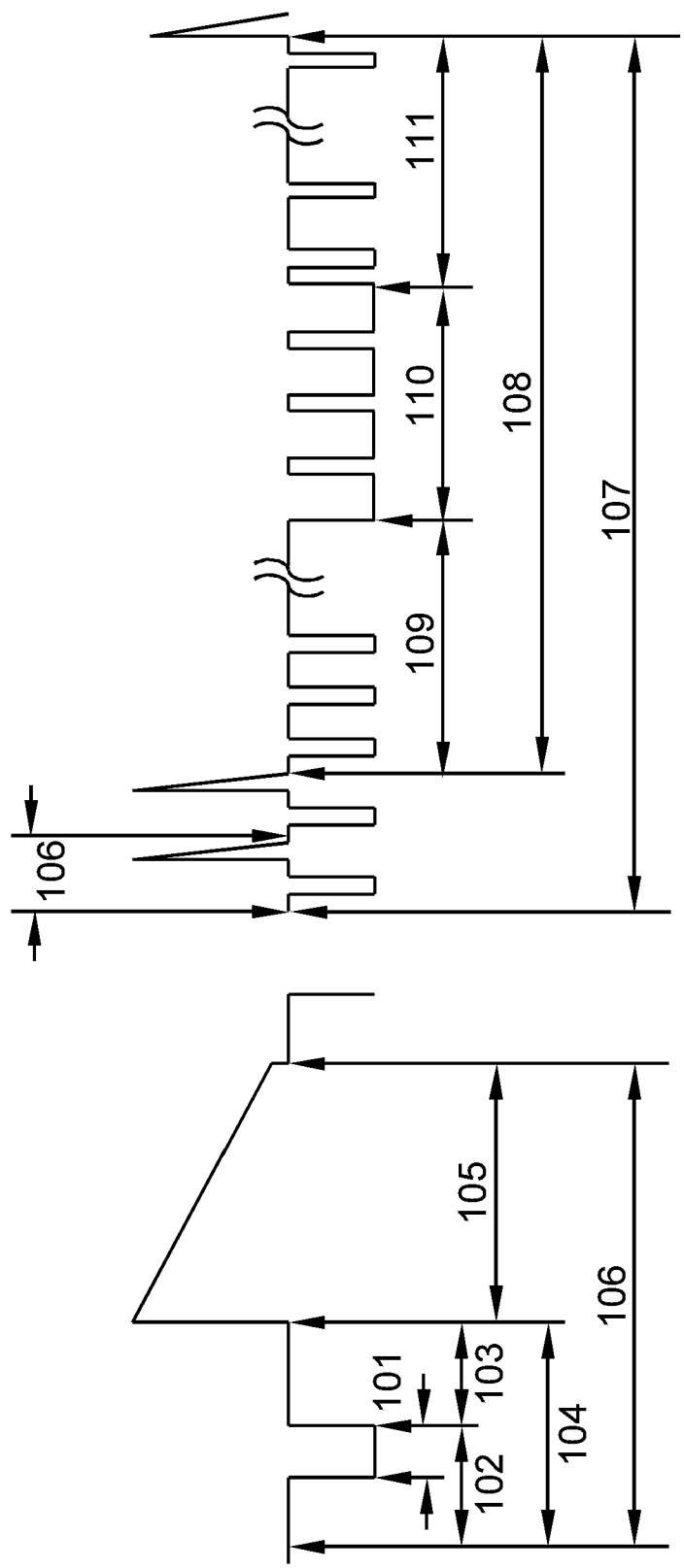
FIG. 1 is a typical analogue video signal.

As shown in FIG. 1—illustrating an analogue video signal—data intended to be displayed are sent together with control signals to the signal receiver. The fragment 106 of the analogue video signal corresponds to a single horizontal line of a picture. Its individual parts represent: a horizontal synchronization (HSync) 101, which denotes a shift to the next line, a horizontal front porch 102, a horizontal back porch 103, a horizontal blank time 104 and time 105, at which information about the contents of a given line is transferred. As shown in signal part 107, after displaying all picture lines, the analogue video signal transmits the information about a vertical synchronization 108 to the signal receiver. Such information consists of three parts: a vertical front porch 109, a vertical synchronization (VSync) 110, which denotes setting of a current location of picture display in the left hand top corner and a vertical back porch 111.

Figure 2:
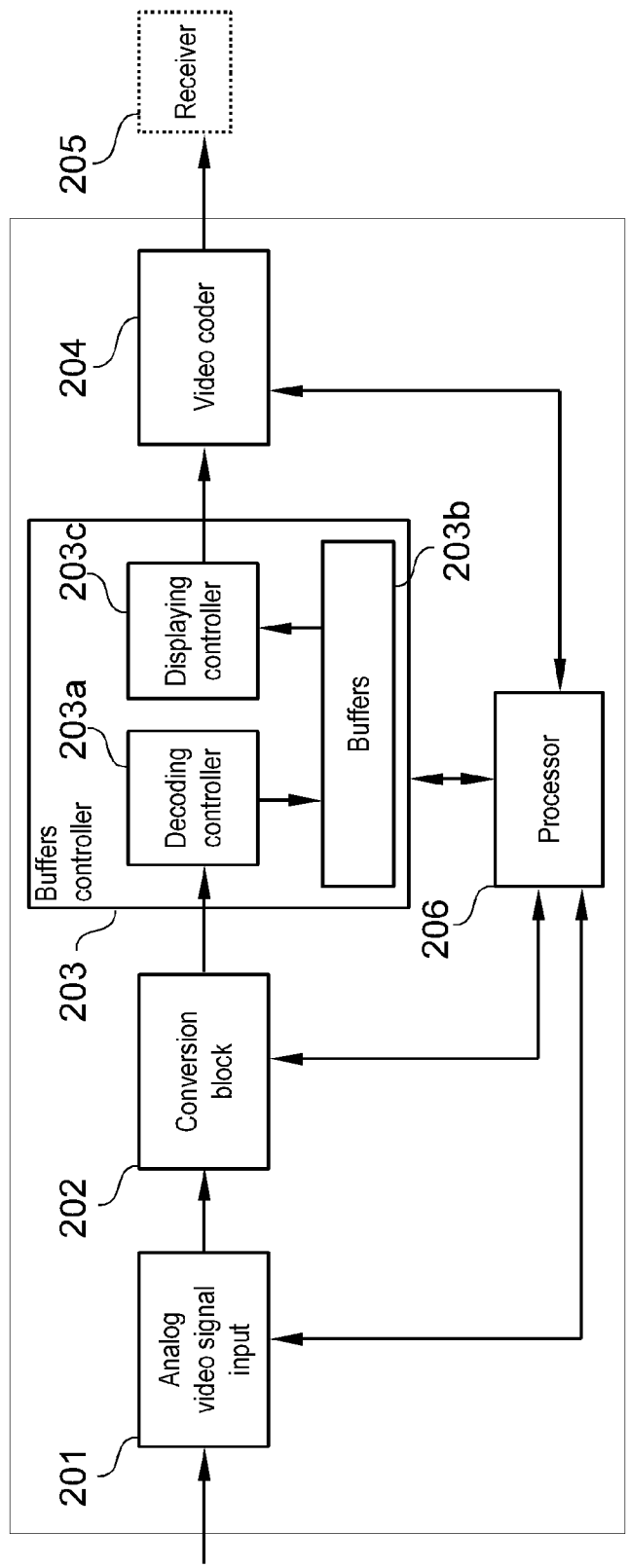
FIG. 2 is a schematic diagram of a receiver of analogue video signal having means for analogue video signal conversion.

A receiver of analogue video signal having means for analogue video signal conversion, for which the method of controlling display of video frames described in the present invention is intended, is shown in FIG. 2. This receiver is a television signal receiver/decoder, which fetches television data from an analogue video signal. A receiving block 201 of the analogue video signal transmits data read from the analogue signal to a conversion block 202, where conversion of the analogue signal into a digital signal takes place. After the conversion, data are transmitted to a buffers controller 203, which consists of a decoding controller 203a, buffers 203b and a displaying controller 203c. The buffer controller 203 controls writing of the data in the buffers 203b, reading of the data from the buffers 203b and transmitting the data form the buffers 203b to a video coder 204, which transforms the digital signal into an analogue signal, which is next transmitted to a receiver 205, for example a television set. The whole process of data processing is controlled by the processor 206 of the television receiver/decoder. In addition, data can be further processed in the buffers.

A method for control of display of video frames, described in the present invention, solves the problem of shifting synchronizing signals of input and output video signals and eliminates picture interferences, which may occur, when the frequency of the input video frames differs from a frequency of the output frames. In the case when the input frequency is higher and frame buffers record more data than can be transferred to the output, certain frames will be omitted (depending on the frequency difference) in order to avoid any interference in the picture display. However, if the input frames frequency is lower than the output frequency, some frames will—if there is such need—be displayed more than once. Typical frame frequencies for a PAL signal are 25 frames per second (50 VSYNC signals). For NTSC, the frequency is 29.97 frames per second (59.94 VSYNC signals).

Figure 3:
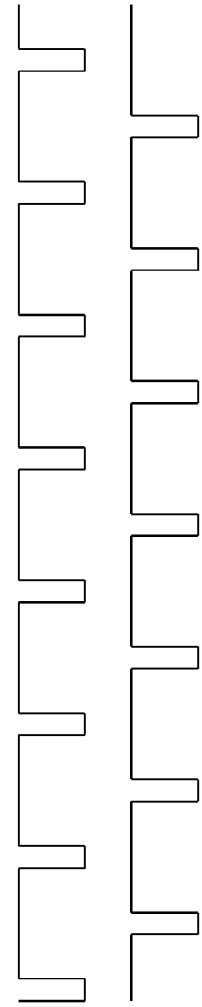
FIG. 3 is a shift of video frame synchronizing signals.

FIG. 3 illustrates an example of a shift between the input and output video signals of the same frequency. Control of the input data by the output timer would create interferences, which could appear to the user as a picture consisting half of one frame, and half of the next one.

Figure 4:
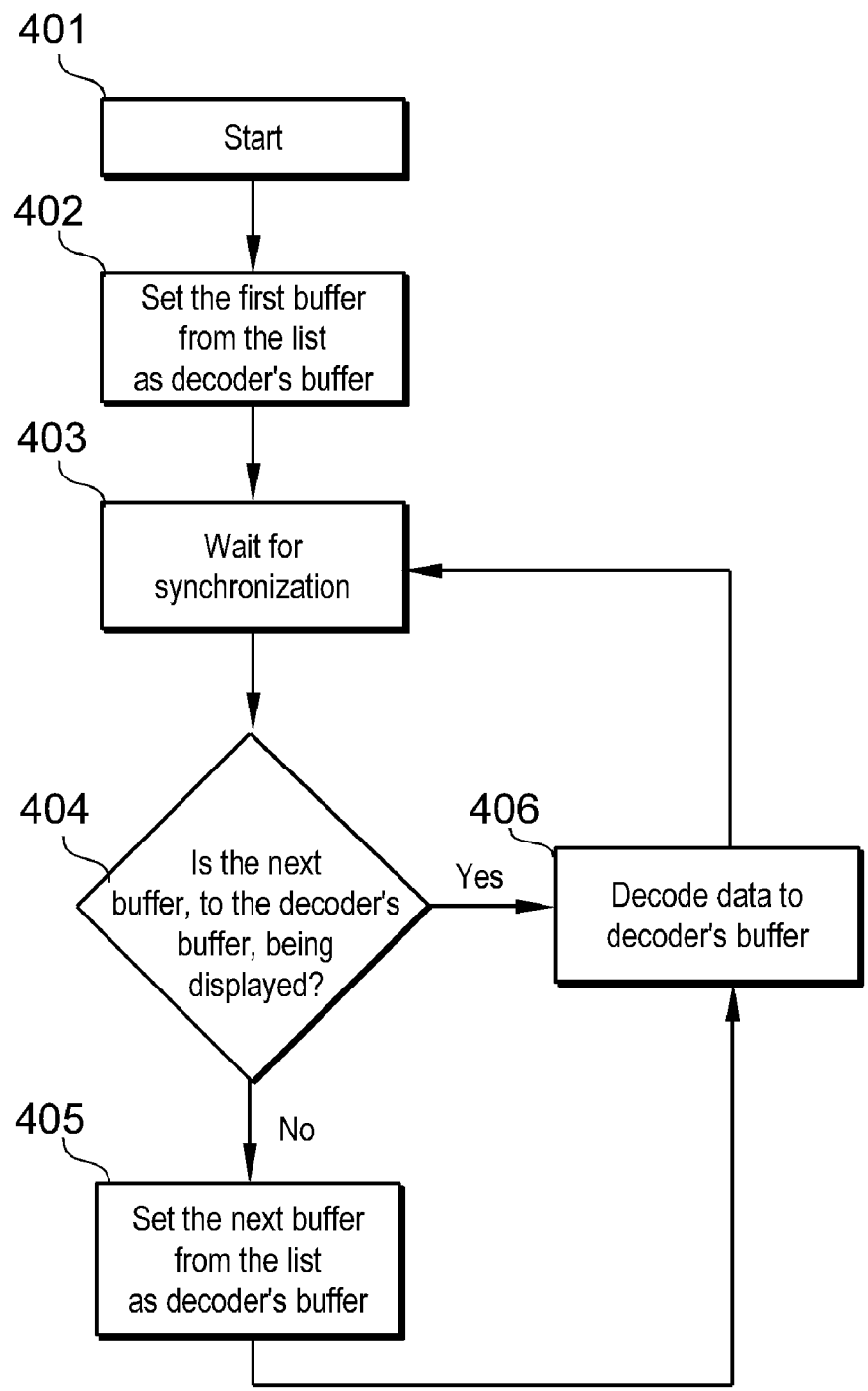
FIG. 4 is a flow chart of a procedure of decoding signal frames.

A flow chart of a procedure of decoding frames is shown in FIG. 4. This procedure controls decoding of a picture frame and writing it to the selected frame buffer. The procedure starts in step 401. Its first task, in step 402, is to set the current decoder buffer—to which the data will be decoded—to the first buffer on a list of frame buffers. In the next step 403, the procedure awaits for a bottom vertical synchronization signal in the input video signal. When the controller detects such signal, the procedure moves to step 404, where a check is made, whether the buffer, next in relation to the current buffer of the decoder, is being displayed. This prevents the overwriting of the data composing the currently displayed video frame. If it is not displayed, the current decoder buffer, to which the data will be written, is set in step 405 to the next buffer and the procedure moves to step 406. In the opposite case, when the next buffer is being displayed, there is a direct shift to step 406, where—after detecting the signal of the top vertical synchronization in the analogue input signal data—decoding to the current decoder buffer the takes place. Finally the procedure proceeds to step 403 and further operates in a loop.

Figure 5:
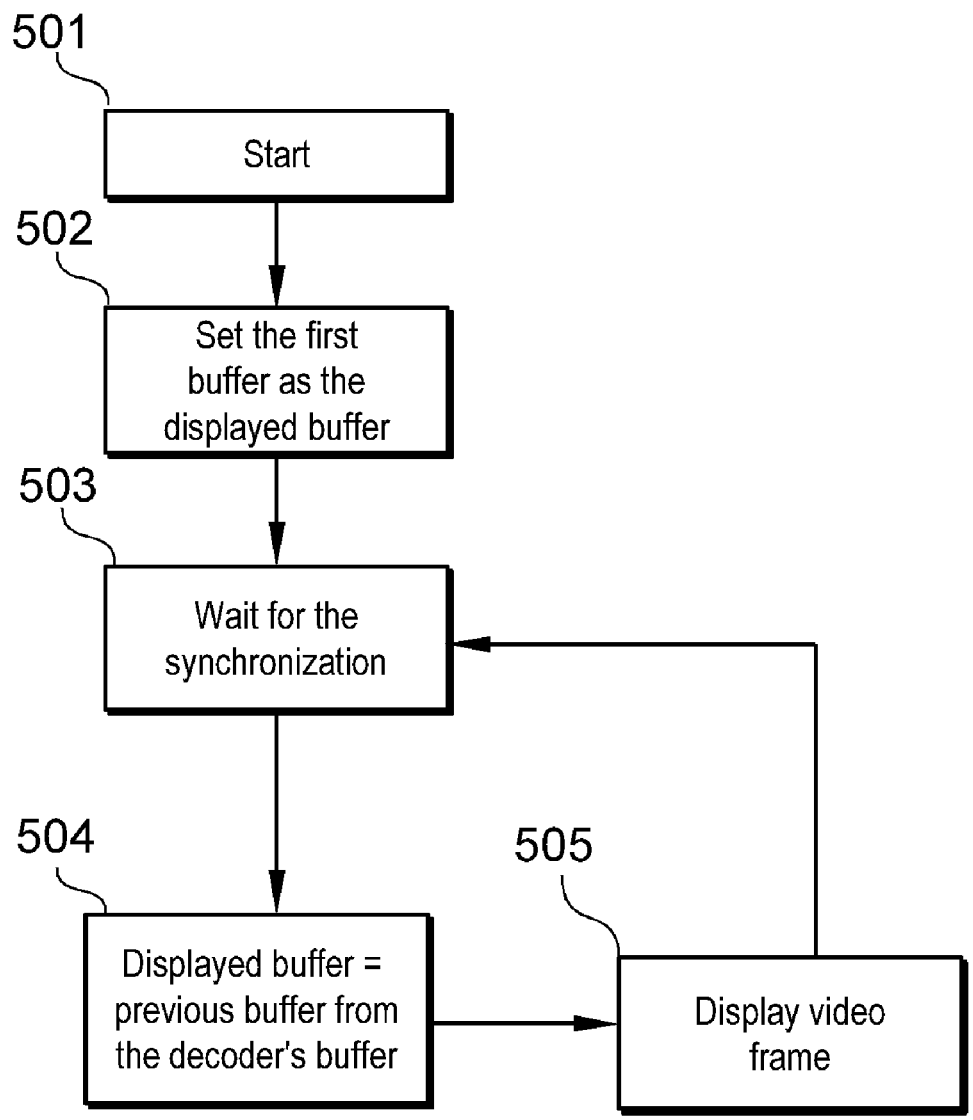
FIG. 5 is a flow chart of a procedure of displaying signal frames.

The procedure of displaying video signal frames is shown in FIG. 5. The procedure starts in step 501. The next step 502 sets the first frame buffer chosen from the frame buffers list, as a buffer to be displayed. Next, in step 503 the system awaits for the bottom vertical synchronization on the analogue output of the video signal. When such signal is detected, the procedure moves to step 504, where the current displayed buffer is set to the previous buffer in relation to the current decoder buffer. The last step 505 is the display of content of the currently set display buffer. This display can take place after a signal of a top vertical synchronization is detected in the analogue output signal. After that, the procedure returns to step 503. From this moment on, the displaying controller operates in a loop.

Figure 6:
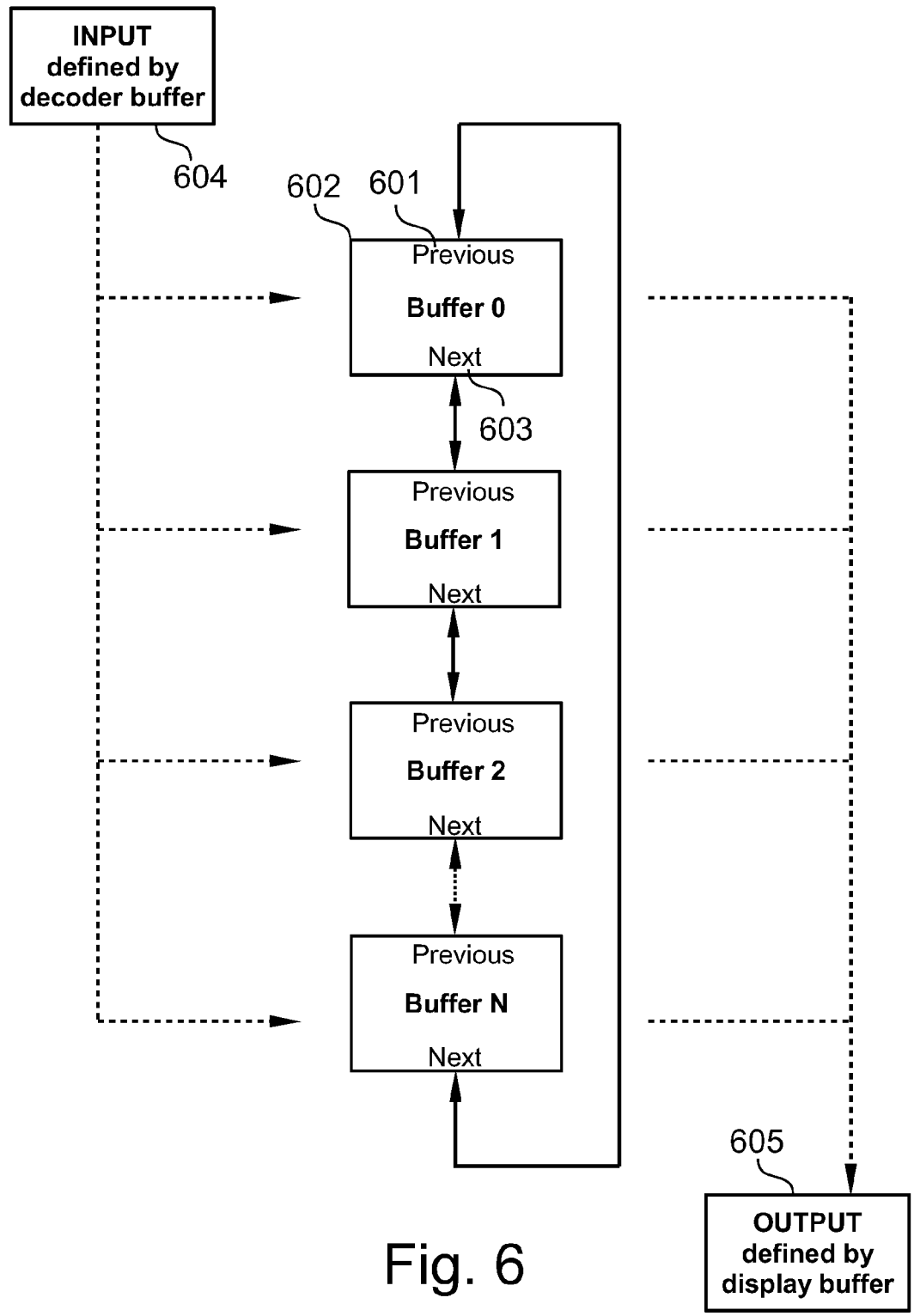
FIG. 6 is a flow chart of a procedure of organizing video signal frame buffers.

Frame buffers—with cyclically recorded data—are shown in FIG. 6. They are organized as a two-way list, where each buffer 602 contains, in addition to the given video frame, a pointer 603 to the next buffer in the two-way list, and a pointer 601 to the previous buffer from the two-way list. As shown in the drawing, there is also a connection between the first buffer and the last buffer in the two-way list. An input 604 to the frame buffers is defined by the decoder buffer pointer set according to the procedure described with reference to FIG. 4 and an output 605 from the frame buffers is defined by the display buffer pointer set according to the procedure described with reference to FIG. 5. The input 604 and the output 605 are managed by the decoding controller 203a and the displaying controller 203c respectively.

Figure 7:
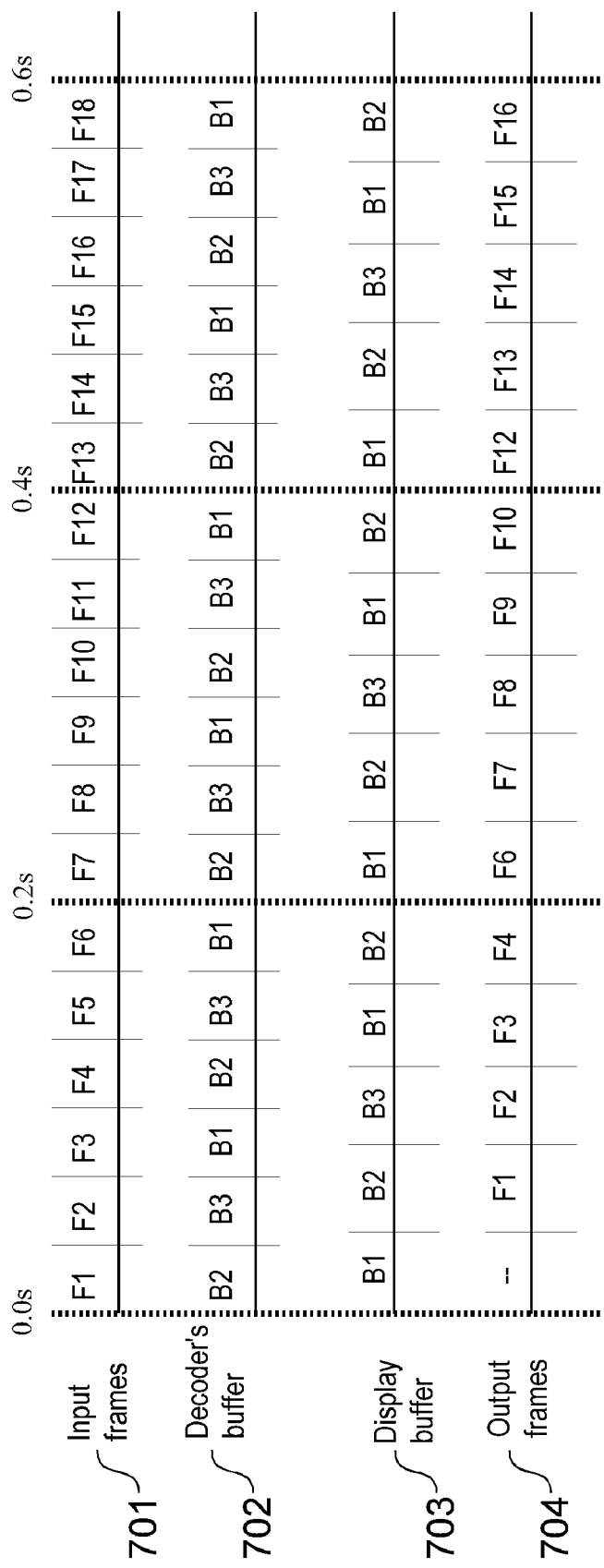
FIG. 7 is a diagram of steps of fetching and displaying of frames when an input frequency is higher than an output frequency.

FIG. 7 shows signal processing when the frequency of the input signal 701 is higher than the frequency of the output signal 704. FIG. 7 also presents the current values of the decoder buffer pointer 702 and the display buffer pointer 703 during the input signal processing. At the beginning of processing of the input signal the frame F1 is being read. The display buffer pointer is set to the B1 buffer, in which there are no data. The B1 buffer is the previous buffer to the B2, which is the current decoder buffer. The time of displaying data from the B1 buffer if predefined and depends on the output signal frequency. After storing the F1 frame in the B2 buffer the next frame F2 is fetched into B3 buffer, which is now the current decoder buffer. After the B1 buffer is displayed, the F1 frame is displayed from the B2 buffer, which is chosen because it is the previous buffer in relation to the current decoder buffer B3. After storing the F6 frame in the B1 buffer, storing of the frame F7 in the B2 buffer takes place. The B2 buffer becomes the current decoder buffer and the B1 buffer becomes the current display buffer since it is the previous buffer in relation to the decoder buffer. Due to this fact the B3 buffer is omitted. The omission of the frame, the B3 buffer containing the F5 frame, or frames will occur when while displaying data of the current display buffer, the B2 buffer containing the F4 frame, the system will decode more than one frame into the remaining buffers, F5 and F6 frames. In such case the next displayed frame will be the F6 frame, which is the most recently decoded one.

Figure 8:
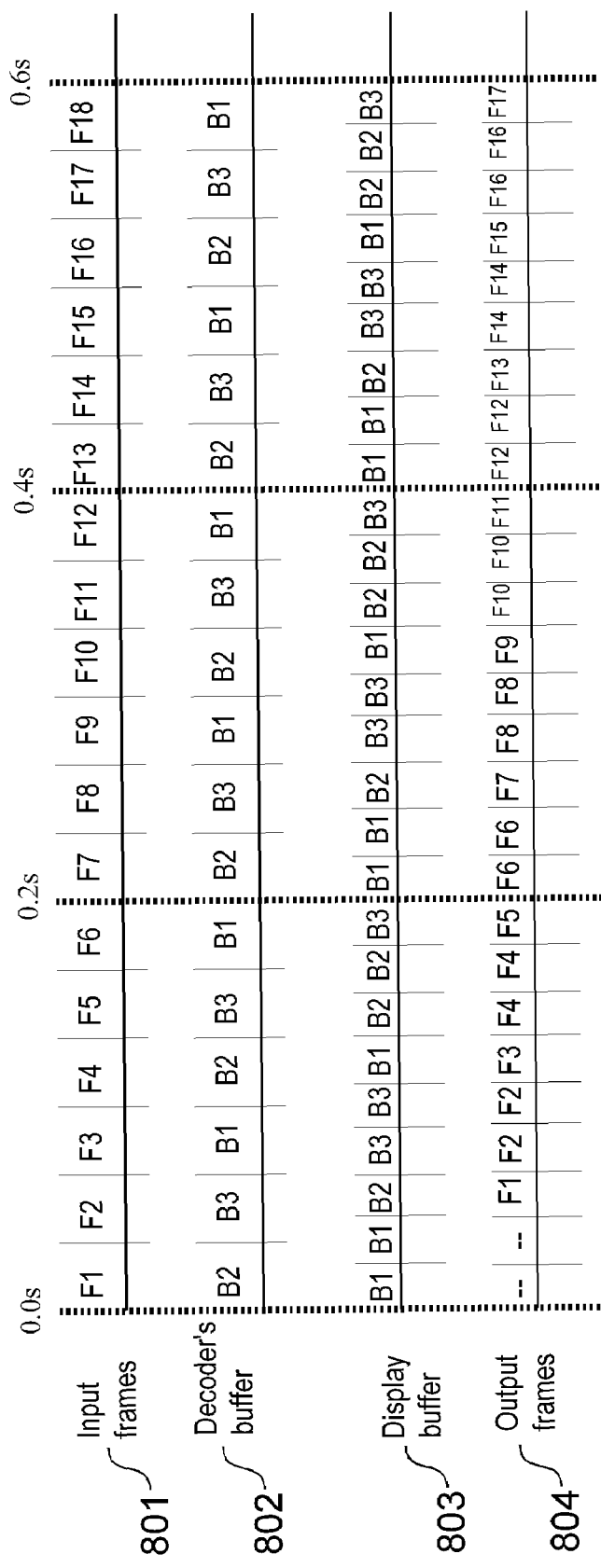
FIG. 8 is a diagram of steps of fetching and displaying of frames when an input frequency is lower than an output frequency.

FIG. 8 shows signal processing when the frequency of the input signal 801 is lower than the frequency of the output signal 804. The drawing also presents the current values of the decoder buffer pointer 802 and the display buffer pointer 803 during the input signal processing. The method of choosing current decoder and display buffers was presented in FIG. 4 and FIG. 5. FIG. 8 illustrates how certain frames will be displayed more than once when the output frames frequency is higher than the input frequency. The first frame that will be displayed twice is the F2 frame from the B3 buffer. This will happen because when the F2 frame is being displayed for the first time there is no new frame to be displayed i.e. the new frame is still being decoded to the B1 buffer.

The preferred embodiment having been thus described, it will now be evident to those skilled in the art that further variation thereto may be contemplated. Such variations are not regarded as a departure from the invention, the true scope of the invention being set forth in the claims appended hereto.

What is claimed is:

1. A receiver of analogue video signal having means for analogue video signal conversion comprising
   a receiving block for receiving a first analogue video signal of a first format;
   a conversion block for conversion of the first analogue signal of the first format into a digital signal and connected to the receiving block;
   a buffer controller of frames included in the digital signal connected to the conversion block and having frame buffers organized as a two-way list, a decoding frame controller and a displaying frame controller;
   a video coder for transforming the digital signal into a second analogue signal of a second format;
   a receiver for displaying the second analogue signal of the second format; and
   a processor for data processing and controlling the receiving block, the conversion block, the buffer controller, the video coder and the receiver.

2. A method for control of display of video frames comprising the steps of:
   creating at least three frame buffers organized as a two-way list;
   setting a current decoder buffer chosen from the frame buffers;
   fetching of data of frames from a first analogue video signal of a first format;
   temporarily storing the data of the frames in the current decoder buffer;
   setting a display buffer chosen from the frame buffers; and
   reading data of a display frame from the display buffer and displaying the frame in a second video format.

3. The method according to claim 2, wherein the last element of the two-way list is linked to the first element of the two-way list.

4. The method according to claim 2, wherein the step of fetching and the storing of the data of the frames comprises the steps of
   setting the current decoder buffer, to which the data of the frames will be decoded, to a first free buffer from the frame buffers;
   awaiting for a bottom vertical synchronization signal in the first analogue video signal of the first format;
   checking if a next buffer, in relation to the current decoder buffer, is being displayed, after the bottom vertical synchronization signal is detected;
   setting the next buffer as the current decoder buffer when the next buffer is not being displayed;
   detecting a top vertical synchronization signal in the first analogue video signal of the first format;
   decoding of the data of the frame to the current decoder buffer; and
   returning to the awaiting for the bottom vertical synchronization signal in the input video signal.

5. The method according to claim 2, wherein the step of reading and displaying data comprises the steps of
   awaiting for an appearance of a bottom vertical synchronization signal in an analogue output video signal;
   setting a previous buffer in relation to the current decoder buffer as the display buffer after appearance of a bottom vertical synchronization signal;
   awaiting for a top synchronization signal in the output video signal;
   displaying the display buffer after detecting the top vertical synchronization signal in the output video signal; and returning to the awaiting for the bottom vertical synchronization signal in the output video signal.

6. A method for control of display of video frames comprising the steps of:

applying at least three frame buffers;

setting a current decoder buffer chosen from the frame buffers;

fetching of data of a frame from a first analogue video signal;

awaiting for a bottom vertical synchronization signal in the first analogue video signal;

checking if a next buffer, in relation to the current decoder buffer, is being displayed, after the bottom vertical synchronization signal is detected;

setting the next buffer as the current decoder buffer when the next buffer is not being displayed;

detecting a top vertical synchronization signal in the first analogue video signal;

decoding of the data of the frame to the current decoder buffer;

temporarily storing the data of the frame in the current decoder buffer;

returning to the awaiting for the bottom vertical synchronization signal in the first analogue video signal;

awaiting for an appearance of a bottom vertical synchronization signal in an analogue output video signal;

setting a previous buffer in relation to the current decoder buffer as the display buffer after appearance of the bottom vertical synchronization signal;

awaiting for a top synchronization signal in the analogue output video signal;

displaying the display buffer after detecting the top vertical synchronization signal in the analogue output video signal; and returning to the awaiting for the bottom vertical synchronization signal in the analogue output video signal.

7. The method according to claim 6, wherein the frame buffers are organized in a two-way list and wherein the last element of the two-way list is linked to the first element of the two-way list.

* * * * *